(12) United States Patent
Gallegos

(10) Patent No.: US 11,808,042 B2
(45) Date of Patent: Nov. 7, 2023

(54) ATTACHMENT BRACKET APPARATUS

(71) Applicant: Unirac, Inc., Lincoln, CA (US)

(72) Inventor: Ernest Gallegos, Albuquerque, NM (US)

(73) Assignee: Unirac Inc., Albuquerque, NM (US)

( * ) Notice: Subject to any disclaimer, the term of this patent is extended or adjusted under 35 U.S.C. 154(b) by 0 days.

(21) Appl. No.: 17/327,569

(22) Filed: May 21, 2021

(65) Prior Publication Data

US 2022/0372762 A1 Nov. 24, 2022

(51) Int. Cl.
*H02S 20/23* (2014.01)
*E04D 13/00* (2006.01)
*F16M 13/02* (2006.01)

(52) U.S. Cl.
CPC ............ *E04D 13/00* (2013.01); *F16M 13/02* (2013.01)

(58) Field of Classification Search
None
See application file for complete search history.

(56) References Cited

U.S. PATENT DOCUMENTS

| | | |
|---|---|---|
| D31,970 S | 12/1899 | McDonald |
| D157,905 S | 3/1950 | Risk |
| D212,125 S | 8/1968 | Barry |
| RE35,485 E | 4/1997 | Stewart |
| D437,771 S | 2/2001 | Barnes et al. |
| D449,623 S | 10/2001 | Neuerburg |
| 6,923,611 B2 | 8/2005 | Kenny |
| 7,012,188 B2 | 3/2006 | Erling |
| D536,239 S | 2/2007 | Tallman |
| D559,083 S | 1/2008 | Brassard |
| D640,289 S | 6/2011 | Wilhelm |
| D647,538 S | 10/2011 | Wilhelm |
| D782,281 S | 3/2017 | Kuo |
| 10,135,387 B2* | 11/2018 | Seery ............... F24S 25/60 |
| 10,767,684 B1* | 9/2020 | Meine ............... F16B 37/14 |
| D934,929 S | 11/2021 | Kremerman |

(Continued)

OTHER PUBLICATIONS

Monotaro.sg. "Monotaro_NPL" 8 . . . [online]. Apr. 18, 2012; [Retrieved on Jul. 20, 2022]. Retrieved from the internet: <url: https://www.monotaro.sg/g/1000185903.html?experiment_1804=1 > p. 1, first picture, last 6-8 sentences of the first paragraph under the picture.

(Continued)

*Primary Examiner* — Terrell L McKinnon
*Assistant Examiner* — Jerry N M N Olivier
(74) *Attorney, Agent, or Firm* — Lee & Hayes, P.C.

(57) ABSTRACT

A bracket includes a base configured to be mounted to a mounting surface and a flange extending from the base and positioned to bisect the base thereby forming a first side and a second side of the base. The base includes a first hole disposed along a central axis of the base and in the first side of the base, a second hole disposed along the central axis of the base and in the second side of the base, and one or more divots formed in a top side of the base and disposed on the first side of the base. Fasteners are inserted through the first hole and the second hole when the bracket is secured to a first mounting structure. Furthermore, fasteners are inserted through the first hole, the second hole, and are drilled through the one or more divots when the bracket is secured to a second mounting structure.

18 Claims, 3 Drawing Sheets

(56) References Cited

U.S. PATENT DOCUMENTS

| | | | |
|---|---|---|---|
| D968,256 S | 11/2022 | Wang et al. | |
| 2006/0096192 A1* | 5/2006 | Daudet | E04B 1/24 |
| | | | 52/204.1 |
| 2016/0111999 A1* | 4/2016 | Stapleton | F24S 25/61 |
| | | | 52/173.3 |
| 2018/0062571 A1* | 3/2018 | Ash | H02S 20/23 |
| 2018/0167023 A1* | 6/2018 | Meine | H02S 20/23 |
| 2023/0258295 A1 | 8/2023 | Gallegos | |

OTHER PUBLICATIONS

The PCT Search Report and Written Opinion dated Sep. 9, 2022 for PCT application No. PCT/US22/30217, 8 pages.

* cited by examiner

ATTACHMENT BRACKET APPARATUS

BACKGROUND

As the solar energy industry continues to grow, the equipment to mount photovoltaic (PV) modules (AKA "solar panels") on different types of structures and/or locations continues to adapt and improve as well. Though a variety of apparatuses exist to secure the PV modules and/or anchor PV module mounting assemblies, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to an attachment bracket apparatus, which is referred to herein as "the bracket." Embodiments of the bracket disclosed herein may be used on a roof or other structure and is a simple, secure, and watertight solution that provides a structure to which solar panel mounting equipment may be attached.

The bracket disclosed herein may include through holes in the bracket through which fasteners are inserted to secure the bracket to a first type of structure such as a rafter or other type of beam. The bracket disclosed herein may also include divots, depressions, or dents (referred to herein as "the divots") in a base of the bracket through which fasteners may be optionally drilled to secure to the bracket to a second type of structure such as roof decking or other type of sheathing. The divots provide a guide where fasteners may be easily drilled through the base of the bracket when securing the bracket to the second type of structure. For example, a thickness of the base of the bracket may be thinner at a location of the divots compared to other portions of the base, allowing an installer to easily drill through the base when securing the bracket to a structure. Furthermore, when fasteners are not drilled through the depressions when the bracket is secured to the first type of structure, the divots prevent water, air, particulate matter, or other undesirable substances from getting below the base of the bracket which could cause damage to the bracket, roof, or other structure to which the bracket is mounted.

The bracket disclosed herein may include an integrated sealing system. Embodiments of the bracket disclosed herein may eliminate the use of standard flashing necessitated by known products. Once the bracket is fastened to a roof (or other structure), a sealant may be injected through a port into an enclosed cavity around the fastener(s) and corresponding roof penetration(s). The force from the sealant dispenser gun increases the pressure inside enclosed cavity forcing air out through a vent opposite the port. This method may allow for sealant to completely fill voids and remove air inside the enclosed cavity around the penetration(s).

Advantages of the embodiments of the bracket disclosed herein include but are not limited to: a bracket that is easily securable to various types of structures; creation of a permanent airtight and watertight seal; elimination of standard flashings and assemblies, thereby reducing costs; elimination of the need to cut shingles; and reduction of the overall cost and time to install a system.

Illustrative Embodiments of an Attachment Bracket

Figure 1:
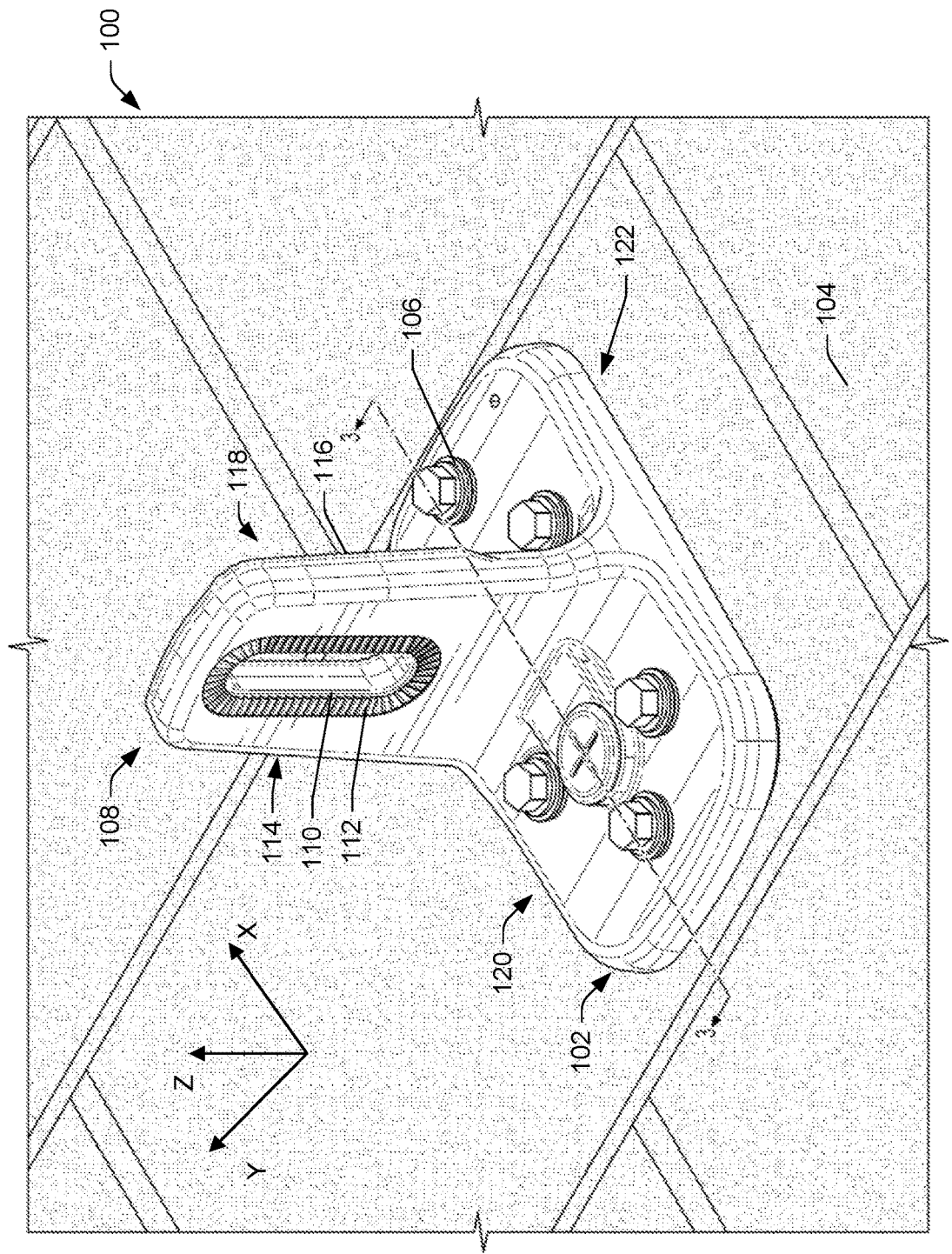
FIG. 1 illustrates a perspective view of an attachment bracket apparatus mounted to a mounting structure, according to an embodiment of this disclosure.

Specifically, FIG. 1 illustrates an attachment bracket apparatus 100 ("bracket"). In an embodiment, the bracket 100 may be configured to support a solar panel mount rail by securing the solar panel mount rail thereto. The bracket 100 includes a base 102 that extends in a first plane (such as a horizontal plane or in the X direction). The base 102 of the bracket 100 is configured to be secured to a mounting structure 104. In an embodiment, the mounting structure 104 may comprise a roof or other structure to which the bracket 100 is coupled or otherwise secured. In an embodiment, various intervening components may be disposed between the bracket 100 and the mounting structure 104. For example, tar paper, shingles, housewrap, roof decking, sheathing, or other components of a roof or other structure may be disposed between the base 102 of the bracket 100 and the mounting structure 104. Despite the various intervening components, the bracket 100 may be secured to the mounting structure via fasteners 106 that are inserted through the base 102 and into the mounting structure, thereby securing the bracket 100 to the mounting structure 104.

The mounting structure 104 may include different types of mounting structures depending on application and/or mounting location. For example, the mounting structure 104 may include a first type of mounting structure such as a rafter, strut, or other type of beam to which the bracket 100 is secured. Furthermore, the mounting structure 104 may include a second type of mounting structure such as roof decking or other type of sheathing to which the bracket 100 is secured. While describing two types of mounting structures, it is to be understood that the bracket 100 may be secured to less than or more than two types of mounting structures. The varying types of mounting structures may include various compositions and mechanical properties. As such, the bracket 100 may be secured to the mounting structure 104 via various configurations of fasteners and components of the bracket 100, as will be described further herein below.

The bracket 100 also includes a flange 108 extending vertically from the base 102 of the bracket 100 in a direction transverse to a direction of extension of the plane of the base 102. In an embodiment, the flange 108 extends in a second plane (such as a vertical plane or in the Z direction) that is substantially perpendicular to the first plane. In an embodiment the flange 108 extends from a top side of the base 102 and is positioned transverse to a length of the base 102, such that the flange 108 bisects the base 102.

The flange 108 includes an aperture 110 extending at least a portion of a length of the flange 108. In an embodiment, one or more fasteners may be inserted through the aperture 110 of the flange 108 in order to secure a secondary structure (such as a solar panel mounting rail) to the flange 108 of the bracket 100. In an embodiment, the flange 108 may include teeth 112 extending from the aperture 110. The teeth 112 may include rachet teeth and may extend radially from the aperture 110. The teeth 112 may be disposed on a first side 114 of the flange 108 and may be configured to correspond with rachet teeth on one or more fasteners that are inserted into the aperture 110 in order to secure the secondary structure thereto. The flange 108 may also include corrugations 116 extending from a second side 118 of the flange 108 that is opposite the first side 114. The corrugations 116 may be configured to extend parallel to each other. As mentioned previously, the flange 108 may be positioned to bisect the base 102, thereby forming a first side 120 and a second side 122 of the base 102.

Figure 2:
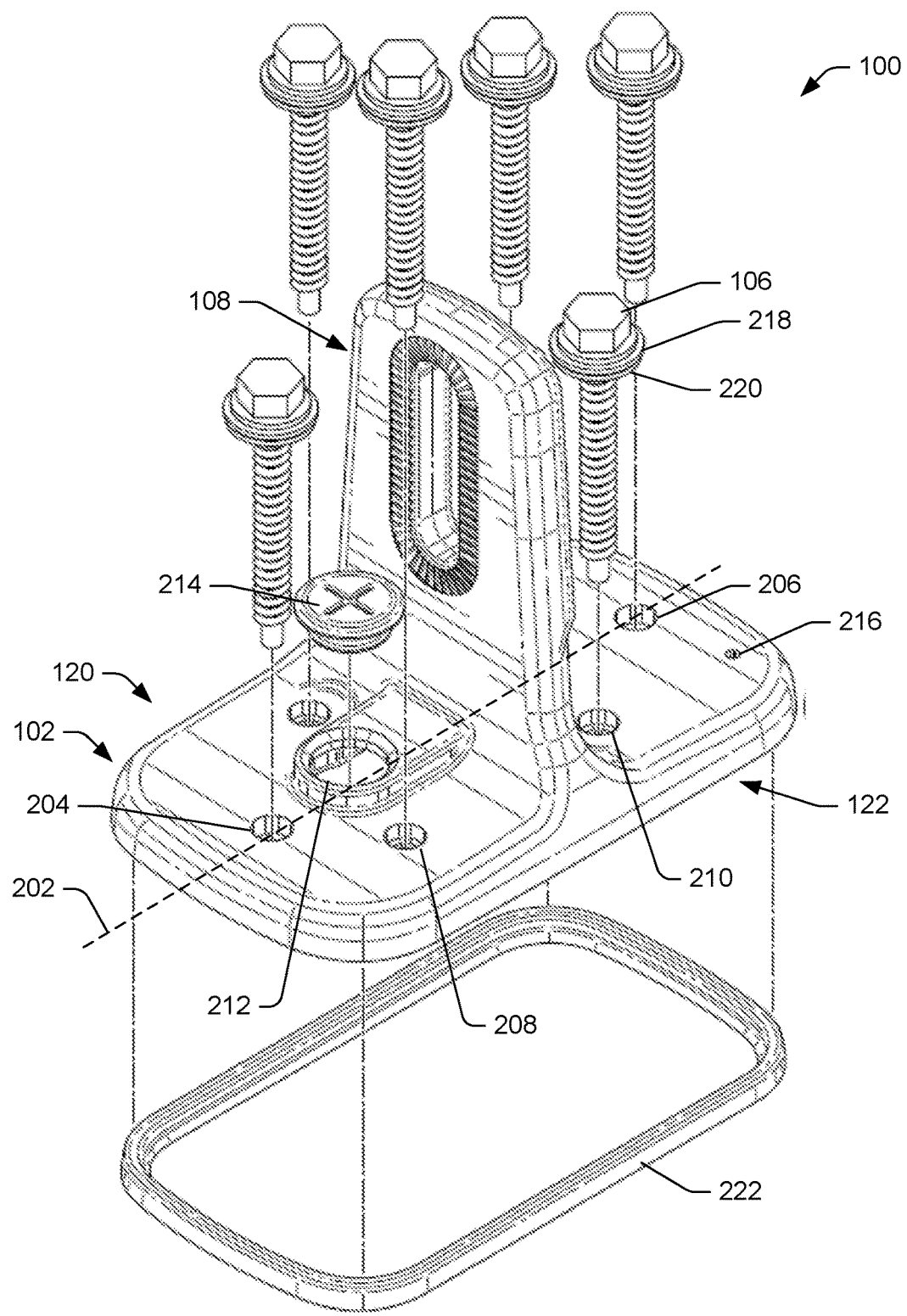
FIG. 2 illustrates an exploded view of various components of the attachment bracket apparatus shown in FIG. 1, according to an embodiment of this disclosure.

FIG. 2 illustrates an exploded view of various components of the bracket 100, as shown and described in FIG. 1. In an embodiment, the base 102 may include a central axis 202 extending along a length of the base 102. In an embodiment, the base 102 includes a first hole 204 disposed along the central axis 202 of the base 102 and in the first side 120 of the base 102. The first hole 202 may be configured to secure a fastener 106 therein. The base 102 may also include a second hole 206 disposed along the central axis 202 of the base 102 and the second side of the base 102. The second hole 206 may be configured to secure a faster therein. In an embodiment, when the bracket 100 is secured to the first type of mounting structure, the bracket 100 may be secured to the mounting structure 104 via fasteners that are inserted through the first hole 204 and the second hole 206. Since rafters and other types of beams are more robust than sheathing or other types of mounting structures, the bracket 100 may be mounted to the first type of mounting structure using fewer fasteners and corresponding holes in the bracket 100 than when the bracket 100 is secured to sheathing. As such, when the bracket 100 is secured to the first type of mounting structure, the bracket 100 may be secured to the mounting structure 104 via fasteners inserted through the first hole 204 and the second hole 206.

In an embodiment, the base 102 further includes one or more first divots 208 disposed on the first side 120 of the base 102 adjacent the central axis 202. The one or more first divots 208 may include semi-circular divots formed in the base 102 and configured to provide a guide for self-drilling fasteners as the self-drilling fasteners are drilled through the one or more first divots 208. Additionally, and/or alternatively, the base 102 may also include one or more second divots 210 disposed on the second side 122 of the base 102 adjacent the central axis 202. The one or more second divots 210 also include semi-circular divots formed in the base 102 and configured to provide a guide for self-drilling fasteners as the self-drilling fasteners are drilled through the one or more first divots 208. In an embodiment, the fasteners are optionally drilled through the one or more first divots 208 and/or the one or more second divots 210 when the bracket 100 is secured to the second type of mounting structure. For example, and as described previously, the second type of mounting structure may include roof decking or other type of sheathing that is less robust than a rafter or other beam. As such, the one or more first divots 208 and the one or more second divots 210 provide a guide where fasteners may be easily drilled through the base 102 of the bracket 100 when securing the bracket to the second type of mounting structure. Furthermore, if some of the one or more first divots 208 and/or the one or more second divots 210 are not drilled when the bracket 100 is secured to the first type of mounting structure or the second type of mounting structure, the one or more first divots 208 and/or the one or more second divots 210 prevent water, air, or other substances from entering into a space between the bracket and the mounting surface 104.

In an embodiment, the bracket 100 further includes an injection port 212 disposed within the first side of the base 102 and in connection with a cavity (shown in FIG. 3) formed by a bottom surface of the base. The injection port 212 may include a plug 214 inserted at least partially within the injection port 212. In an embodiment, the plug 214 is penetrable by a sealant dispenser such that the injection port 212 receives sealant via injection, thereby permitting passage of the sealant into an empty space formed between the cavity of the base and the mounting structure. The plug 214 may comprise a rubber plug having slits formed therein to allow a tip of a sealant dispensing gun to pass therethrough. In an embodiment, the bracket 100 further includes a vent port 216 disposed within the second side 210 of the base 102 and in connection with the cavity. The vent port 216 is configured to allow sealant to displace air within the empty space when sealant is injected into the empty space.

As shown in FIG. 2, the bracket 100 includes fasteners 106 that may include one or more washers disposed between a head of the fasteners 106 and the base 102 of the bracket 100. For example, the fasteners 106 may include a metallic washer 218 disposed proximate the head of the fastener and a rubber washer 220 disposed proximate the base 102 of the bracket 100 and between the base 102 and the metallic washer 218. In an embodiment, the rubber washer 220 seals a hole formed by a fastener by at least partially covering a hole in which the fastener is inserted and by engaging threading along a shaft of the fastener.

The bracket 100 further includes a gasket 222 (or seal) that is configured to be inserted into a groove (shown and described with respect to FIG. 3) in the bracket 100. The gasket 222 may provide an airtight and watertight seal for the base 102 when the base 102 is mounted to the mounting structure 104. The gasket 222 may comprise rubber, fiber, foam, rubber molding compounds, or any other suitable material that provides a secure seal between the base 102 of the bracket 100 and the mounting structure 104.

Figure 3:
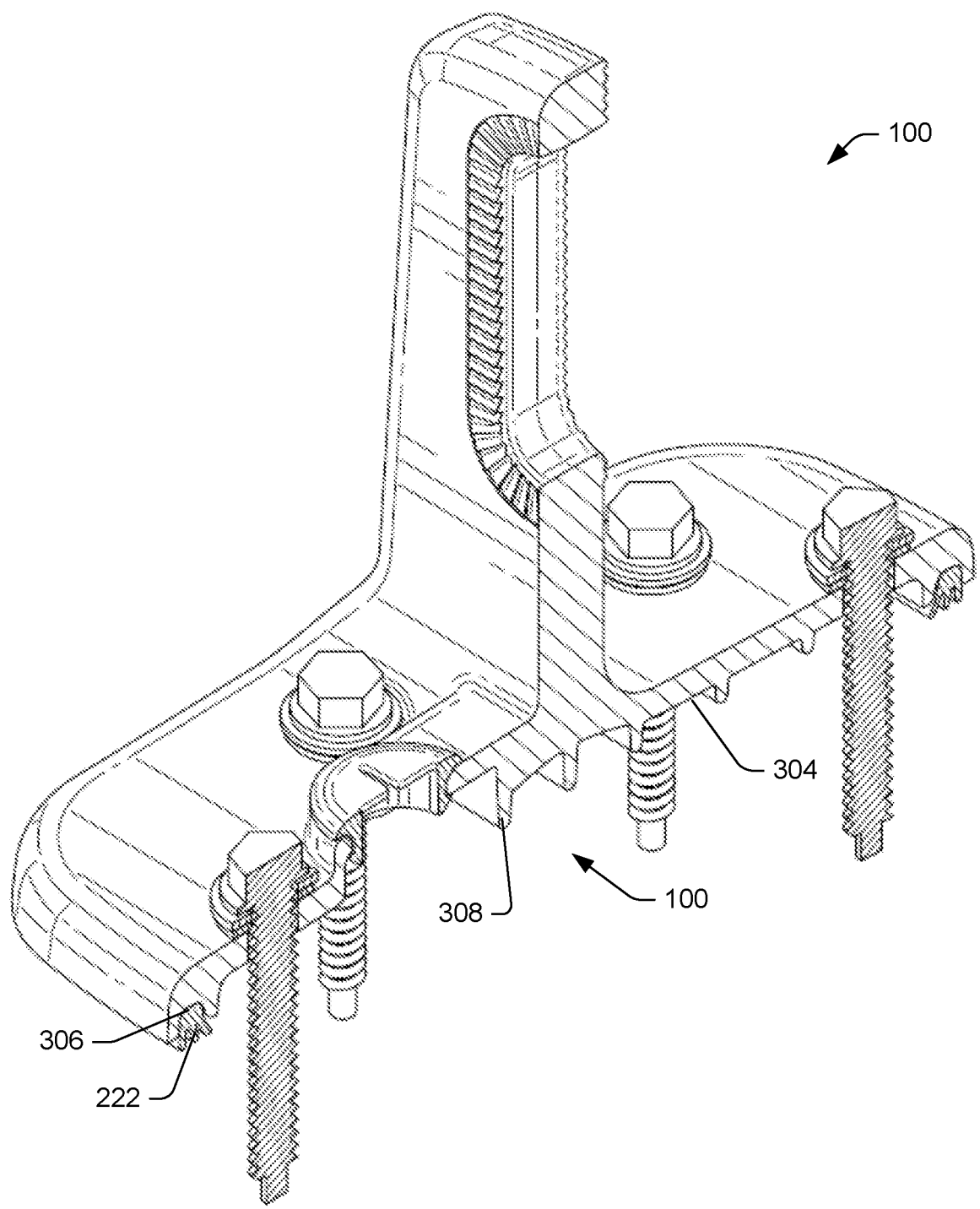
FIG. 3 illustrates a cross-sectional view of the attachment bracket apparatus shown in FIG. 1, according to an embodiment of this disclosure.

FIG. 3 illustrates a cross-sectional view of the bracket 100. As described previously, the bracket 100 includes a cavity 302 formed at least partially by a bottom surface 304 (or bottom side) of the bracket 100. The cavity 302 is configured to enclose an empty space between the cavity and the mounting surface 104. In an embodiment, when sealant is injected into the cavity, the sealant may completely fill the cavity 302. The bracket 100 further includes a groove 306 that circumscribes a bottom portion (or bottom side) of the base 102. As mentioned previously, the bracket 100 includes the gasket 222 that is inserted into the groove 306 such that the gasket 222 fills the groove 306 and at least a portion of the gasket 222 extends from the groove 306.

The base 102 may further include one or more ribs 308 extending from the bottom surface 304 of the base 102. The one or more ribs 308 may strengthen the base 102, while allowing for a reduced amount of material to form the cavity 302 in the base 102.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An attachment bracket apparatus comprising:
   a base for mounting to a mounting surface, a central axis extending along a length direction of the base; and
   a flange extending vertically from the base and oriented so that a width thereof extends in a direction that is transverse to the length direction of the base, such that the flange bisects the base, thereby delineating a first side of the base and a second side of the base,
   wherein the base includes:
      a first hole disposed along the central axis of the base and in the first side of the base, the first hole configured to secure a first fastener therein,
      a second hole disposed along the central axis of the base and in the second side of the base, the second hole configured to secure a second fastener therein,
      one or more first divots disposed on the first side of the base in a position that is offset from the central axis and offset in the length direction from the first hole, and
      one or more second divots disposed on the second side of the base in a position that is offset from the central axis and offset in the length direction from the second hole,
      a cavity formed at least in part by a bottom side of the base, wherein, upon installation, the base encloses empty space within the cavity against the mounting surface,
      an injection port disposed within the first side of the base and in connection with the cavity, and
      a plug inserted at least partially within the injection port, wherein the plug is penetrable via a slit formed therein such that, upon installation, the injection port permits passage of a sealant via injection to fill the empty space.

2. The attachment bracket apparatus of claim 1, wherein the flange extends from a top side of the base and the base further includes a groove that circumscribes a bottom side of the base.

3. The attachment bracket apparatus of claim 2, further comprising a gasket configured to be inserted within the groove such that the gasket fills the groove and at least a portion of the gasket extends from the groove.

4. The attachment bracket apparatus of claim 1, wherein the mounting surface includes a rafter or other type of beam.

5. The attachment bracket apparatus of claim 1, wherein the mounting surface includes roof decking or other type of sheathing.

6. The attachment bracket apparatus of claim 1, further comprising a vent port disposed within the second side of the base and in connection with the cavity, the vent port being configured to allow sealant to displace air within the empty space when sealant is injected into the empty space.

7. The attachment bracket apparatus of claim 1, wherein the one or more first divots and the one or more second divots include semi-circular divots in the base configured to provide a guide for the self-drilling fasteners as the self-drilling fasteners are drilled through one or more first divots and the one or more second divots of the base.

8. The attachment bracket apparatus of claim 1, wherein the flange includes an aperture therein and the flange is shaped such that a solar panel mount rail is securable to the flange of the attachment bracket apparatus.

9. The attachment bracket apparatus of claim 1, wherein:
   the position of the one or more first divots is offset from the central axis and offset in the length direction from the first hole so that the one or more first divots are positioned diagonally with respect to the first hole, and
   the position of the one or more second divots is offset from the central axis and offset in the length direction from the second hole so that the one or more second divots are positioned diagonally with respect to the second hole.

10. A bracket comprising:
    a base having a central axis extending along a length direction of the base;
    a flange extending from the base and oriented to bisect the base, thereby delineating a first side and a second side of the base;
    a first fastener position disposed along the central axis of the base and on the first side of the base;
    a second fastener position disposed along the central axis of the base and on the second side of the base; and
    one or more divots formed in a top side of the base, the one or more divots being offset from the central axis and offset in the length direction from the first fastener position and the second fastener position,
    wherein the base includes a cavity formed at least in part by a bottom side of the base,
    an injection port in connection with the cavity; and
    a plug inserted at least partially within the injection port, wherein the plug is penetrable via a slit formed therein to permit passage of a sealant into the cavity via the injection port.

11. The bracket of claim 10, further comprising first fasteners positioned at the first fastener position and the second fastener position to secure the bracket to a first mounting surface that includes a rafter or other type of beam.

12. The bracket of claim 11, further comprising one or more second fasteners positioned at the one or more divots to secure the bracket to a second mounting surface that includes roof decking or other type of sheathing.

13. The bracket of claim 10, wherein the flange includes an aperture extending at least a portion of a length of the flange, and
    wherein one or more fasteners are insertable through the aperture to secure a solar panel mounting rail to the flange.

14. The bracket of claim 10, wherein the flange includes corrugations extending from at least one surface of the flange, and
    wherein the corrugations extend parallel to each other.

15. A bracket comprising:
    a base having a central axis extending along a length direction of the base;
    a flange extending from the base;
    a first fastener position disposed along the central axis of the base;
    a second fastener position disposed along the central axis of the base; and
    one or more third fastener positions disposed in a top side of the base, the one or more third fastener positions being offset from the central axis and offset in the length direction from the first fastener position and the second fastener position, and wherein at least one of the one or more third fastener positions is a divot, first fasteners inserted through the first fastener position and the second fastener position into a first mounting surface;

second fasteners inserted through the one or more third fastener positions and into a second mounting surface different from the first mounting surface;

wherein the base includes a cavity formed at least in part by a bottom side of the base, an injection port in connection with the cavity; and a plug inserted at least partially within the injection port, wherein the plug is penetrable via a slit formed therein such that the injection port receives a sealant via injection, thereby permitting passage of the sealant into the cavity.

16. The bracket of claim 15, wherein the first mounting surface is a rafter or other beam and the second mounting surface is roof decking or other type of sheathing.

17. The bracket of claim 15, wherein the base further includes:
a vent port disposed atop the second side of the base and in connection with the cavity, the vent port being configured to allow sealant to displace air within the empty space when sealant is injected into the empty space.

18. The bracket of claim 15, wherein:
the flange includes an aperture extending at least a portion of a length of the flange, and
the bracket further comprises one or more fasteners inserted through the aperture to secure a solar panel mounting rail to the flange.

* * * * *